US007579059B2

(12) United States Patent
Chamandy

(10) Patent No.: US 7,579,059 B2
(45) Date of Patent: Aug. 25, 2009

(54) WEB OF RECORD MEMBERS, TAGS, LABELS, AND METHOD OF MAKING SAME

(75) Inventor: Paul A. Chamandy, Ithaca, NY (US)

(73) Assignee: Paxar Americas, Inc., Miamisburg, OH (US)

( * ) Notice: Subject to any disclaimer, the term of this patent is extended or adjusted under 35 U.S.C. 154(b) by 617 days.

(21) Appl. No.: 11/328,016

(22) Filed: Jan. 9, 2006

(65) Prior Publication Data

US 2007/0160794 A1 Jul. 12, 2007

(51) Int. Cl.
*B32B 9/00* (2006.01)
*B32B 33/00* (2006.01)
*G09F 3/00* (2006.01)

(52) U.S. Cl. .................... 428/40.1; 428/42.2; 428/42.3; 428/43

(58) Field of Classification Search ................ 428/40.1, 428/42.2, 42.3, 43
See application file for complete search history.

(56) References Cited

U.S. PATENT DOCUMENTS 4,309,468 A * 1/1982 St. Aubin ................... 428/42.3
4,727,055 A 2/1988 Aoyagi et al.
5,389,414 A 2/1995 Popat
5,702,127 A * 12/1997 Korondi, Jr. ................. 283/81
5,833,273 A 11/1998 Strenk et al.
6,737,140 B2 5/2004 Moliski

FOREIGN PATENT DOCUMENTS

DE G 9216694.6 3/1993

OTHER PUBLICATIONS

U.S. Appl. No. 29/186,393, Jul. 2003, Arnold et al.

* cited by examiner

*Primary Examiner*—Patricia L Nordmeyer
(74) *Attorney, Agent, or Firm*—Joseph J. Grass

(57) ABSTRACT

There is disclosed a composite web of record members and a method of making same, the composite web provides tag/label pairs comprised of a tag and a label which can be feed through a printer and in which a tag/label pair can be cut from the tag web with its underlying release liner. The tag web 20 is simple to manufacture using readily available materials. The label 22 can be adhesively adhered to garment wrappings and the tag is rendered non-tacky by use of a patterned adhesive deadener.

11 Claims, 5 Drawing Sheets

WEB OF RECORD MEMBERS, TAGS, LABELS, AND METHOD OF MAKING SAME

BACKGROUND OF THE INVENTION

1. Field of the Invention

The invention relates to webs of record members, tags, labels and method of making same.

2. Brief Description of the Prior Art

The following patent documents are made of record: U.S. Pat. Nos. 4,727,055; 5,389,414; 5,833,273; 6,737,140; U.S. design patent application Ser. No. 29/186,393; and German Gebrauchsmuster G 92 16 694.6.

SUMMARY OF THE INVENTION

A preferred embodiment provides a composite web of pairs of tags and labels manufacturable from an adhesive-coated tag stock web and a release liner web, wherein the tags and labels can be printed in pairs in a suitable printer such as a thermal printer and severed from the composite web in pairs, and wherein the tags and labels are releasable from the release liner and the tag of each pair has a tab foldable and adhesively adhered to a portion of the remainder of the tag, and wherein the portion of the tag beyond the tab is masked off by adhesive deadener to provide a non-tacky tag.

BRIEF DESCRIPTION OF THE DIAGRAMMATIC DRAWINGS

DETAILED DESCRIPTION OF THE PREFERRED EMBODIMENTS

Figure 3:
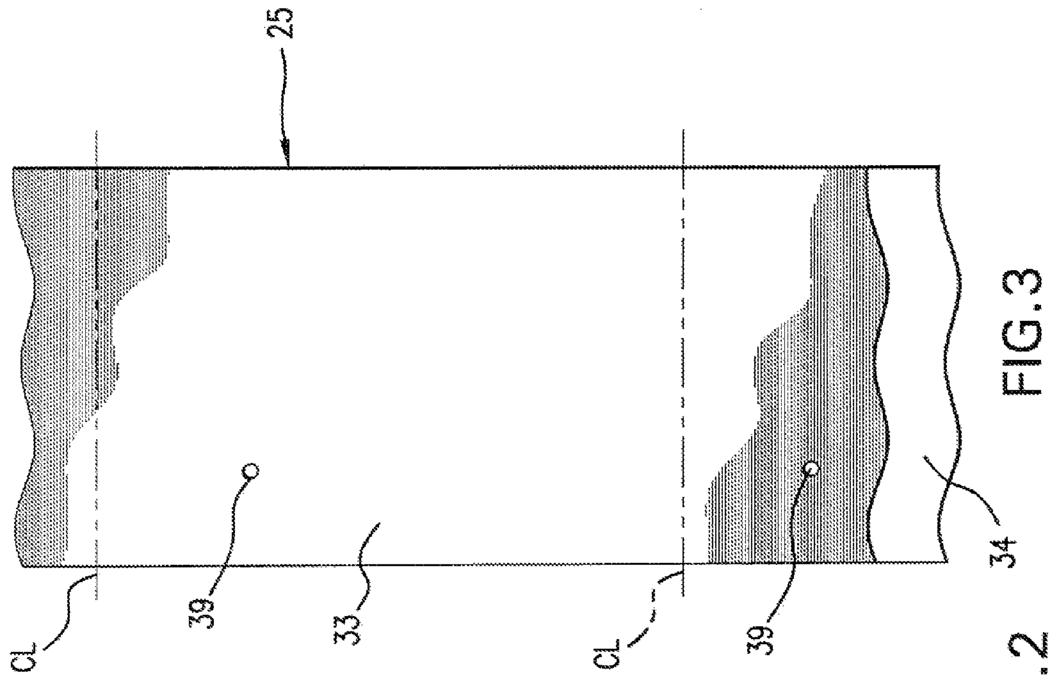
FIG. 3 is a top plan view of a release liner of the composite web of FIGS. 1 and 2.
Figure 1:
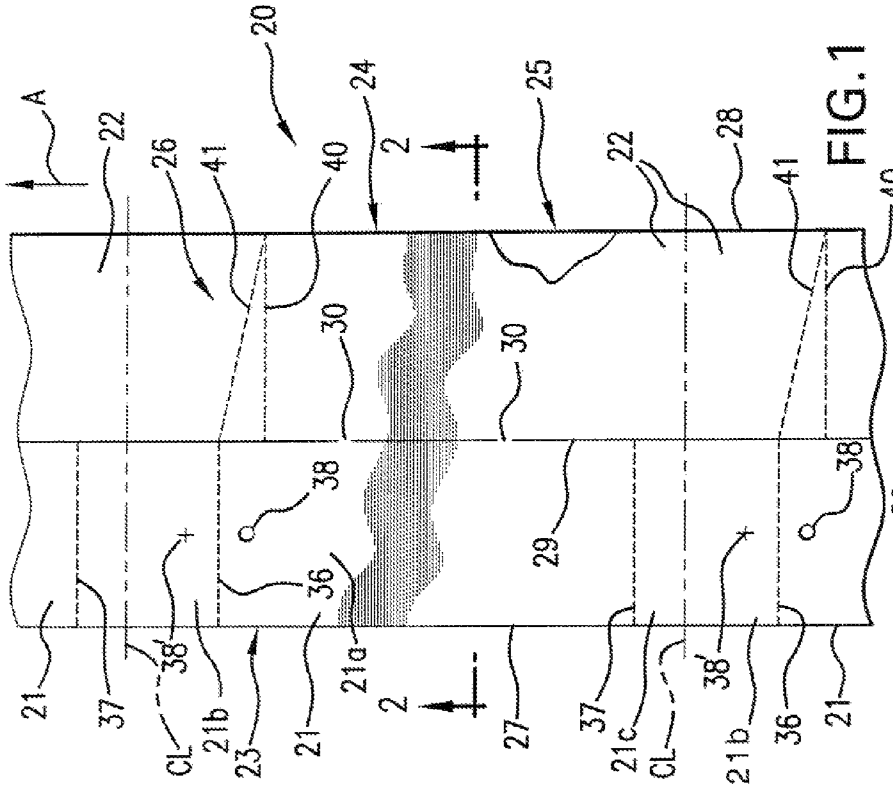
FIG. 1 is a top plan view of a fragmentary portion of a composite web of record members comprised of tags and labels.

With reference initially to FIGS. 1 and 3, there is shown a composite web generally indicated at 20 of record members or tags 21 and record members or labels 22. The tags 21 are disposed end-to-end and are part of a web generally indicated at 23 of tags 21. The labels 22 are disposed end-to-end and are part of a web generally indicated at 24 of labels 22. Underlying the webs 23 and 24 is a release liner generally indicated at 25 shown to be in web form. The tags 21 and labels 22 is formed from a web of tag stock preferably of the type for producing hang tags. Hand tags are of a type which can be hung from garments and the like such as by means of a plastic fastener of the type sold by Paxar Americas, Inc. under its trademark TAGGER TAIL®. The tag stock can be of a single ply or of more than one ply as illustrated in U.S. Pat. No. 4,727,055. The tags 21 and the labels 22 are shown to be connected end-to-end, however, the tags 21 and the labels 22 are separable in pairs by cutting along cut lines CL, as is preferred. As such, both the tag stock web 26 and the underlying release liner web 25 can be completely severed simultaneously along the cut line CL. Alternatively, the tag stock web 26 can be severed along the cut line CL and the release liner web 25 can be uncut or partially severed along the cut line CL for manual separation of a pair of a tag 21 and a label 22, but this is not the most preferred construction.

Typically the tags 21 and the labels 22 are printed in a suitable printer (not shown) such as a thermal printer or in a laser printer illustrated in U.S. Pat. No. 5,389,414 and thereafter one pair of a tag 21 and a label 22 which are side-by-side and the underlying portion of the release liner web 25 are severed from the web 20. The web 20 is preferably fed through the printer in the direction of arrow A.

Figure 2:
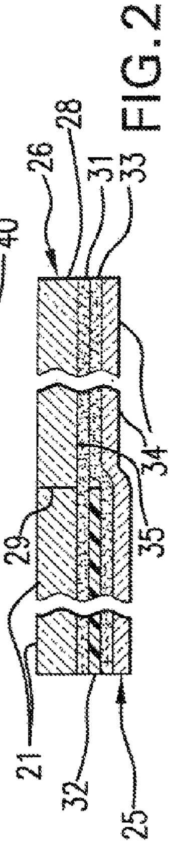
FIG. 2 is an enlarged fragmentary sectional view taken along line 2-2 of FIG. 1.
Figure 4:
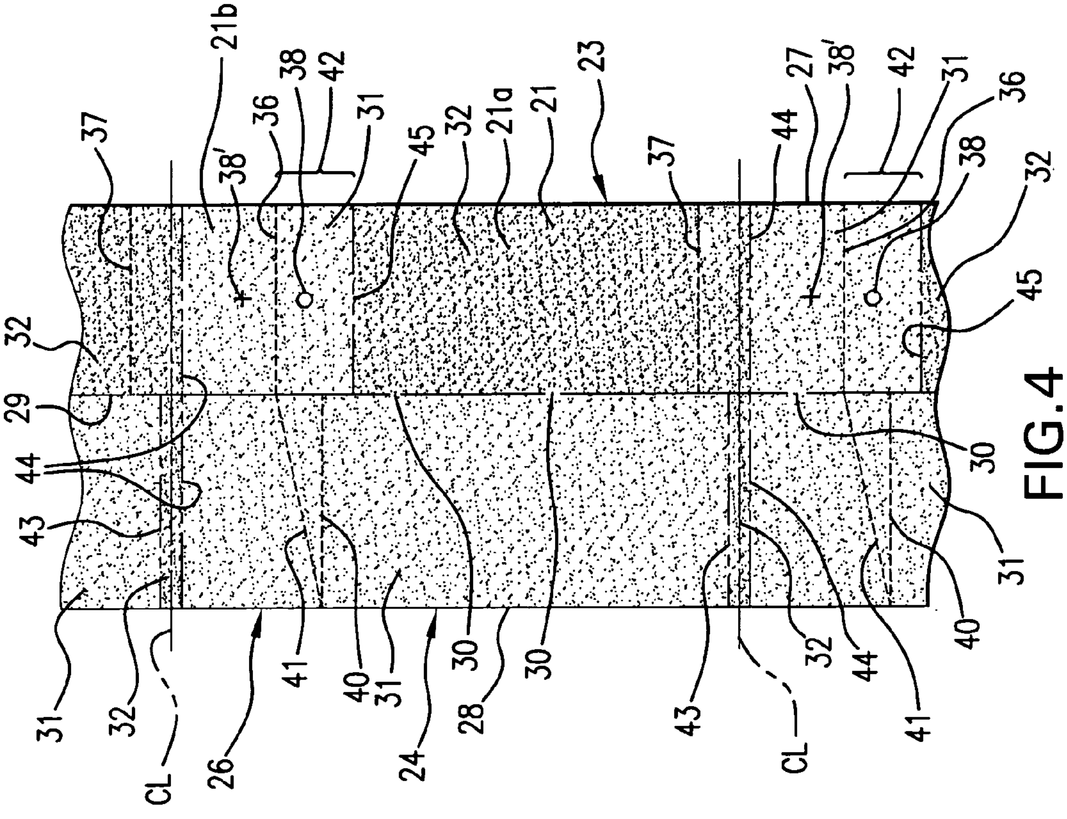
FIG. 4 is a bottom plan view of the tag stock web.

As shown in FIG. 1, the tag web 23 and the label web 24 are formed by at least partially severing the tag stock web 26 longitudinally between its side edges 27 and 28, as indicated at 29. The side edges 27 and 28 and the line of at least partially severing 29 are preferably parallel. The tags 21 are illustrated to be slightly wider than the labels 21. It is most preferred to only partially sever the web 26 longitudinally to maintain the integrity of the composite web 20. In particular, the web 26 is preferably completely severed as shown in FIGS. 1, 2 and 4, except for frangible ties or lands indicated at 30 disposed at longitudinally spaced locations along the web 26, and as such the web 26 is considered to be partially severed along the line 29. The lands 30 help prevent the tag web 23 and the label web 24 from shifting relative to each other not only during the manufacturing method but also during printing in a printer.

With reference to FIG. 2, the tag stock web 26, a coating of adhesive 31, a coating of adhesive deadener 32, a coating of release material 33 such as silicone, and a release liner 34 are shown exaggeratedly thick for clarity. The adhesive 31 is of the pressure sensitive or tacky type and is coated onto and adheres to a face 35 of the tag stock web 26. Adhesive deadener or detackifier 32 is coated onto the adhesive under portions of the tag web 23. The liner 25 fully underlies both the tag web 23 and the label web 24.

Each tag 21 is shown to include a main tag section or portion 21*a* and tabs 21*b* and 21*c*. The detachable tab 21*b* is connected to the tag portion 21*a* by a line of weakening or partial severing 36. The tab 21*c* is connected to the tag portion 21*a* by a line of weakening or partial severing 37. The tag portion 21*a* has a through-hole 38. There are also through-holes 39 in the release liner web 25 aligned with the holes 38 in the tag stock web 26. The tabs 21*b* have one or more slits 38' shown to be cross-hair slits through the tab stock 26. As is preferred, the release liner web 25 is free of any cuts except for the holes 39.

Each label 22 in the label web 24 has lines of weakening or partial severing 40 and 41. The line of partial severing 40 is much closer to one cut line CL than the other cut line CL and extends transversely or perpendicular to the long or longitudinal direction of the web 20. The line of partial severing 41 extends obliquely to the longitudinal direction, and in particular is shown to extend from the end of the intersection of the lines of partial severing 29 and 36 to one end of the line of partial severing at side edge 28. The slope of the line of partial severing 41 preferably matches the slope of a conventional triangular-shaped wire garment hanger 53 (FIGS. 10 and 11) having sloped portions 54 which terminates at a hook (not shown).

With reference to FIG. 4, the underside of the tag web 26 is shown. As is preferred, the entire underside of adhesive 31 of the tag web 23 is shown masked off or deadened by the coating of adhesive deadener or detackifier 32 except for almost all of the tab 21*b* and a portion 42 of the tag portion 21*a*. In addition, the adhesive deadener 32 is coated onto the underside of the label web 24 on both sides of each cut line CL between borders 43 and 44. The adhesive deadener 32 on the label web 24 extends from side edge 28 to the line of partial severing 29. The adhesive deadener 32 extends longitudinally from the borderline or border 45 in the tab web 23 downwardly to a borderline or border 44 in the tag web 23 as viewed in FIG. 4. The adhesive deadener 32 in the label web 23 exists only between borderline or border 43 and borderline or border 44 that straddle each cut line CL. It is seen that the adhesive 31 outside the adhesive-deadened areas or zones indicated at 32 releasably holds the tag stock web 26 to the release liner web 25 during manufacture and while the web 26 is being advanced through the printer. The areas deadened by the adhesive deadener 32 are in a generally L-shaped configuration as shown in FIG. 4. The lines of partial severing 36, 37, 40, 40*a* and 41 are shown by dash-dash lines, while the borders 43, 44 and 45 are shown by dot-dash lines. The partial severing lines 36, 37, 40, 40*a* and 41' can be provided by perforating, scoring, creasing, crushing or any other suitable way.

Figure 5:
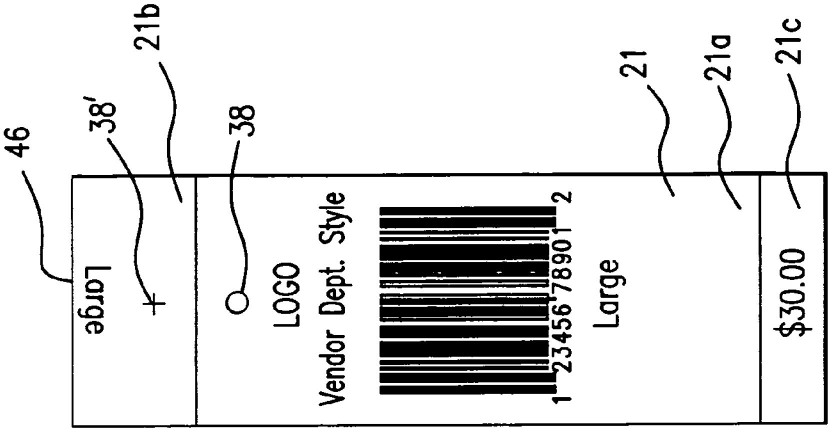
FIG. 5 is a top plan view of the front of a printed tag of the composite web shown imprinted in FIG. 1.
Figure 7:
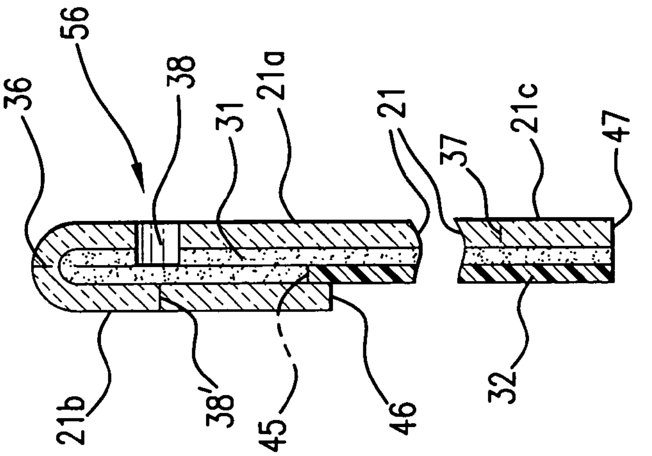
FIG. 7 is an enlarged sectional view of the tag with its tab folded about a fold line onto a portion of the tag.
Figure 6:
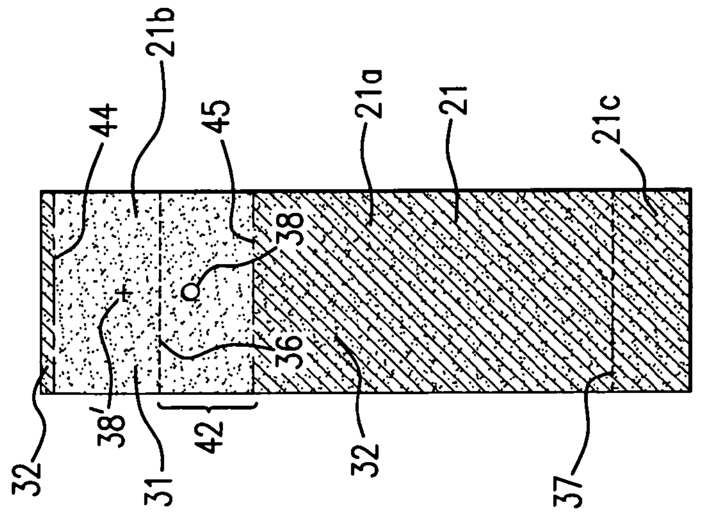
FIG. 6 is a bottom plan view of the tag shown in FIG. 5.

FIG. 5 shows the front side of the tag 21 as having been printed. FIG. 6 shows the underside of the tag 21. It is noted that throughout, borders 43, 44 and 45 are not cut lines or lines of complete or partial severing. FIG. 6 shows that the distance between borderline 44 and the line of partial severing 36 is most preferably equal to the distance between the line of partial severing 36 and the borderline 45. Also, the area of the tab 21*b* between the borderline 44 and the line of partial severing 36 and the area of the portion 42 are preferably equal. Therefore, when the tab 21*b* is folded about line of partial severing or fold line 36, the undeadened adhesive 31 exists only between the tab 21*b* and the zone or portion 42 of the tag 21. The tag portion 21*a* beyond end 46 of the folded tab 21*b* is non-tacky as best shown in FIG. 7. Accordingly, no outer surface of the tag is tacky because all of the adhesive is covered by the tab 21*b* or is masked-off by the adhesive deadener 32.

Figure 11:
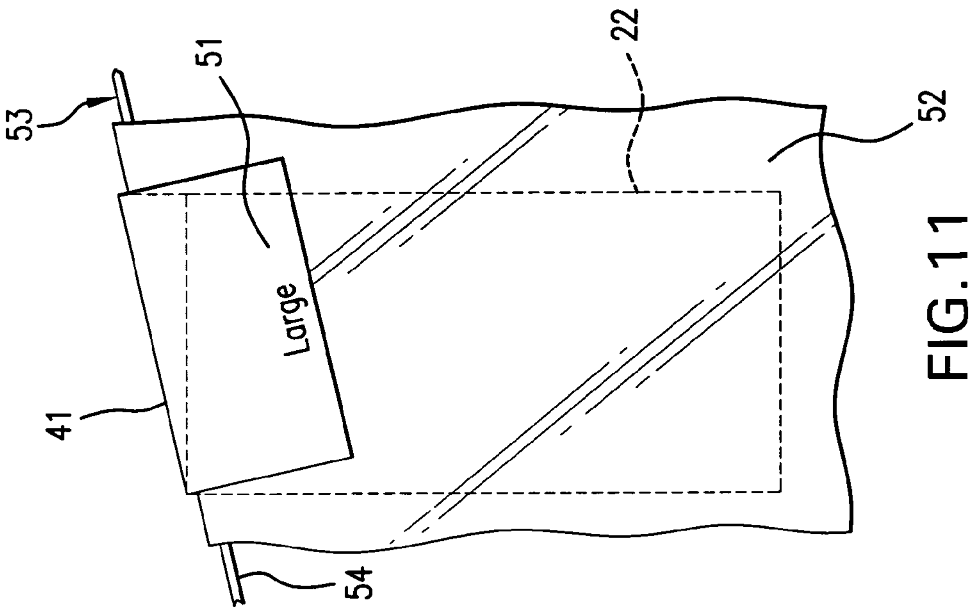
FIG. 11 is a rear elevational view of the label and bag suspended by the hanger.
Figure 10:
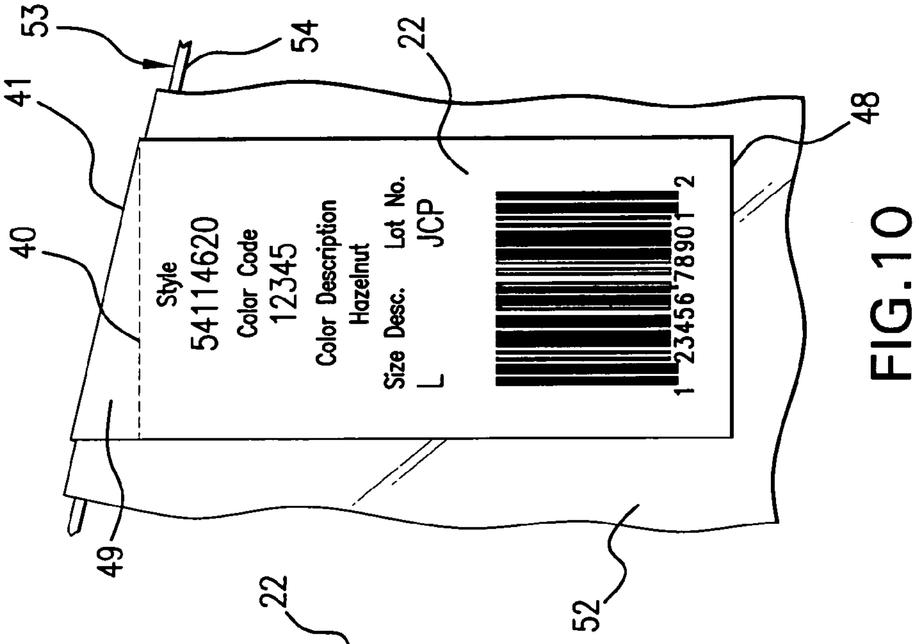
FIG. 10 is a front elevational view showing the label of FIG. 9 adhered to a polyethylene garment-containing bag suspended by a hanger.
Figure 9:
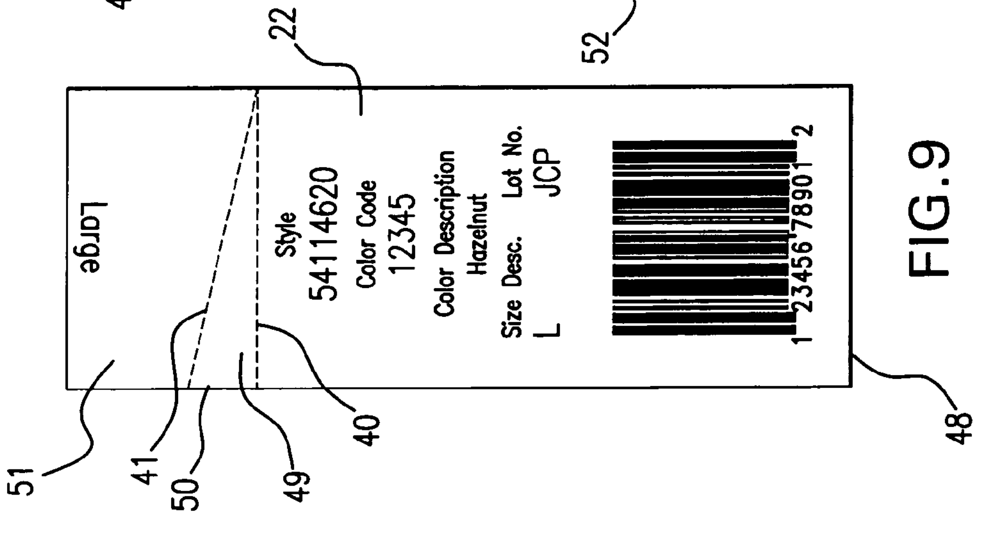
FIG. 9 is a top plan view of the printed label shown in unprinted form in FIG. 1.

As best shown in FIGS. 9 through 11, the label 22 has been printed on the printer. The main portion of the label 22 is disposed between the line of partial severing 40 and end edge 48 of the label 22. A tab 51 is formed by the line of partial severing or fold line 41. The entire underside of the label 22 is preferably coated with adhesive 31, and the adhesive 31 on the label 22 is undeadened except for a narrow margin between the cut line CL and the borderline 44 at one end portion of the label and a narrow margin between the cut line CL and the borderline 43 at the other end portion of the label 22, as best shown in FIG. 4. FIG. 10 shows the label 22 adhesively adhered to a polyethylene wrapping 52 for a garment which is hung on a generally triangular wire hanger 53 having a hook (not shown). The hanger 53 has two sloping wire portions 54 only one of which is partially shown. The angle the partial severing line 41 makes with the rest of the label 22 preferably matches the slope of the sloping wire hanger portion 54. The label 22 is visible from the front of the wrapping 52 in FIG. 10, except for the tab 51, while the tab 51 is visible along with the rear of the wrapping 52. The front part of the label 22 and the tab 51 can be color coded with a preprinted stripe or the like for ease of recognition. The partial severing 40 can be used as a fold line when used with a hanger (not shown) having a horizontal rung, in which case the tab 49 as well as the tab 51 are folded about fold line 40 and both the tab 49 and the tab 51 are folded onto and adhered to the rear side of wrapping 52. In the event the label 22 is applied to a wrapped garment that will lie flat and will be stacked with other wrapped garments, the label 22 can be applied to the wrapping without folding any tab 49 or 51.

Figure 13:
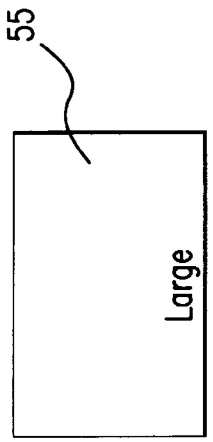
FIG. 13 is a top plan view of a portion or tab of the label shown in FIG. 12 detached from the remainder of the label.
Figure 14:
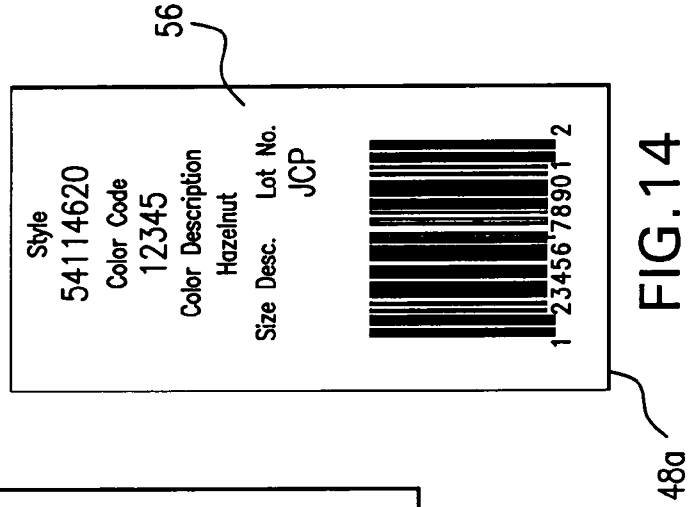
FIG. 14 is a top plan view of a portion of the label shown in FIG. 12 from which the tab has been removed.
Figure 12:
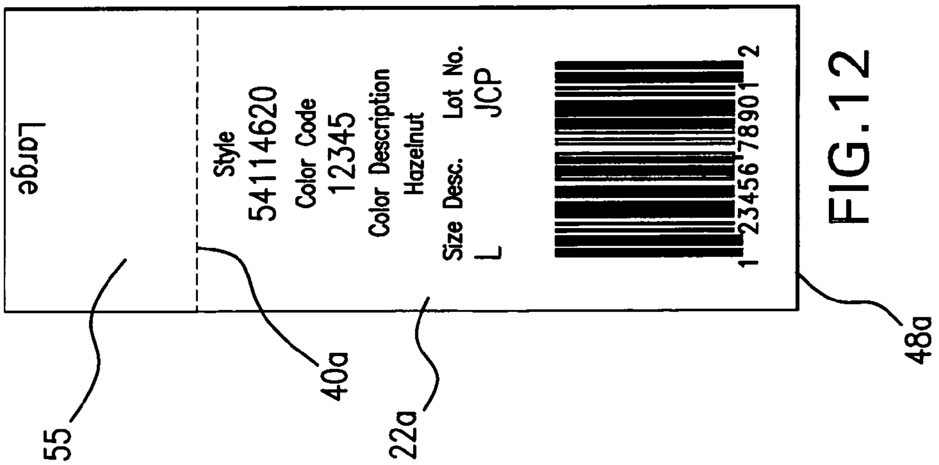
FIG. 12 is a top plan view of an alternative form of label from the label illustrated in FIGS. 1, 2, 4, 9, 10 and 11.

The embodiment of FIGS. 12 through 14 is identical to the embodiment of FIGS. 1 through 11, except as referenced below. The same reference characters are used in the embodiment of FIGS. 12 through 14 as is the embodiment of FIGS. 1 through 11 to designate like components with the addition of reference character "a". The tag 22*a* has a rectangular tab 55 which is the same size as the portion 49 and the tab 51 combined. The tab 55 can be folded about the line of partial severing 40*a* and used with a hanger with a horizontal rung. The tab 55 can be folded so as to be at the rear of the garment wrapper. Alternatively, the tab 55 can be detached from the rest of the label 22 indicated at 56. Once the tab 55 is detached it can be used as a separate label at a different location in the wrapping or elsewhere. The label part 56 can be applied to the wrapping in a vertical manner as shown.

Figure 8:
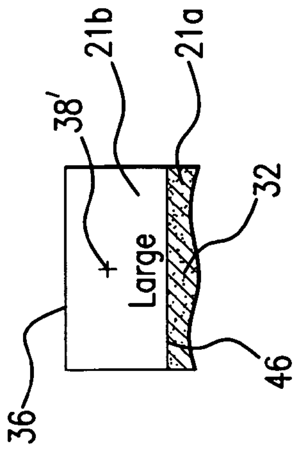
FIG. 8 is a fragmentary view of the tag with its tab folded onto a portion of the tag.

The tag stock web 26 is preferably made of a paper or plastics material which is strong enough to serve as a hand tag. Because the tag 21 is doubled over at the tab 21*b* as best shown in FIGS. 7 and 8, the tag 21 has a double thickness at the tab 21*b*. The tag 21 is thus stronger at the attacher hole 56 formed by the hole 38 and the slits 38' which are aligned with the hole 38. The tag material adjacent the slits 38' grips the attacher needle of a tag attacher illustrated for example in U.S. design patent application Ser. No. 29/186,393. Accordingly, the tag stock can be thinner or of a lighter gauge than if the attacher hole 56 were through tag stock of single thickness. This results in a saving of tag stock.

The starting materials for making the composite web 20 are a release coated liner web 25 and tag stock web 26. If desired, that liner 34 can be acquired in roll form and subsequently coated with a suitable uniform release coating such as silicone or a waxy release coat. The tag stock 26 is coated with the pressure sensitive or tacky adhesive 31 and the adhesive 31 is preferably applied in a uniform manner along and across the web 26. This is known as a "full gum" coating. If desired, the adhesive 31 can be applied in a patterned coating.

The adhesive-coated tag stock web 26 is then pattern-coated with adhesive deadener 32, for example, in a pattern as best shown in FIG. 4. Thereafter, the release liner web 25 and the tag stock web 26 with its adhesive coated and partial adhesive deadener overcoat are laminated to provide the composite web 20. Although the composite web 20 is shown to be "one-wide", with one tag and one label side-by-side across the web 20, the composite web 20 could initially be two-wide, three-wide or wider. Thereafter, the wide web could be slit into narrow one-wide webs. After lamination, the composite web 20 is preferably partially severed longitudinally along line 29, that is, preferably leaving spaced lands 30 to help maintain the webs 23 and 24 in registration with each other and to help maintain the webs 23 and 24 adhered to the release liner web 25 until ready to be removed by the user. Although the tag web 23 and the label web 24 can be completely severed during production along cut line CL without cutting into or severing the release liner web 25, it is preferred to cut the one tag 21 and one label 22 disposed side-by-side from the end portion of the web 20 following printing in the printer. It is noted that when a tag 21 and a label 22 and the underlying release liner 25 are cut from the remainder of the web 20, the tag 21 and the label are easily manually peeled from the release liner 25 and the lands 30 are easily manually torn to separate a tag 21 from a label 22. The lands are frangible and do not interfere with manual separation of the tag 21 and its side-by-side label 22. When printing a paired tag 21 and its side-by-side label 22, the tag 21 and the label 22 can be printed with the same or some of the same information so as to match the information on one with the other. Alternatively, the tag 21 and the label 22 can have different printed information.

According to a specific embodiment of method of making a composite web of record members, certain steps are: providing a longitudinally extending release liner 25 in web form having a liner 34 and a release coating 33, providing a longitudinally extending web of printable tag stock 26 having a face 35 with a tacky adhesive 31, applying adhesive deadener 32 in a pattern to the adhesive 31 to provide masked-off portions of the tag web 23, laminating the tag stock web 26 to the release liner web 25, at least partially severing the tag stock web 26 longitudinally between side edges 27 and 28 of the tag stock web 26 to provide a tag web 23 and a label web 24 in side-by-side relationship, the web 20 having tags 21 and labels 22 severed in pairs with the tag of each pair having a tab 21*c*, wherein when the tag 22 of a pair is releasable from the release liner 25, the tab 21*b* is foldable and can be adhesively adhered to a portion of the remainder of the tag 21*a*, and the portion of the tag 22 beyond the folded tab 21*b* being masked-off with adhesive deadener to provide a substantially non-tacky tag. It is preferred that the adhesive deadener also be applied on both sides of the cut line CL of the label 22 as well as to the tag 21 so that when the cutter of the printer cuts a printed tag and label pair from the web 20, the cutter cuts through deadened or detackified adhesive -which is less problemsome than cutting through undeadened tacky adhesive.

It is preferred to completely deaden or detackify the adhesive in the areas or zones depicted in the drawings and described herein. Thus, there is no exposed tacky planar surface on the tag 21. By way of example, not limitation, a suitable adhesive deadener or detackifier is: UV Flexo Adhesive Deadner with Extra Brightener PT#AD1000FB sold by RAD-Cure Corp., 9 Audrey Place, Fairfield, N.Y. 07004 U.S.A.

In that the adhesive 31 and the adhesive deadener 32 are substantially clear and transparent, the customer is not aware that the tag 21 has deadened adhesive on its outer surface.

If desired, the adhesive 31 can be patterned, for example, either the adhesive area of the tab 21*b* or the adhesive area of the portion 42 of tag portion 21*a* can be free of adhesive 31, if desired.

Other embodiments and modifications of the invention will suggest themselves to those skilled in the art, and all such of these as come within the spirit of this invention are included within its scope as best defined by the appended claims.

I claim:

1. A label having a face with a coating of tacky adhesive, the label having two generally parallel side edges, a line of partial severing extending obliquely across the label with respect to the side edges and a second line of partial severing extending generally perpendicular to the side edges.

2. A label as defined in claim 1, wherein the first-mentioned line of partial severing and the essentially perpendicular line of partial severing meet at one of the side edges of the label.

3. A label as defined in claim 1, wherein the label is elongate and the two generally parallel edges extend in the long direction.

4. A tag having a coating of tacky adhesive on one face thereof;

a line of partial severing to define a tab, the tab being folded onto and adherable by the adhesive to an adjacent portion of the remainder of the tag, adhesive deadener on the adhesive on the portion of the tag beyond the tab, and a hole through the tab and the portion of the remainder of the tag to which the tab is adhered.

5. A tag as defined in claim 4, wherein the hole is comprised of cross-hair shaped slits in the tab and a hole in the adjacent portion of the tag.

6. A composite web of record members, comprising:

a longitudinally extending release liner web coated with a release coating, a longitudinally extending web of printable tag stock having a face with a tacky adhesive, the tag stock web being at least partially severed longitudinally between side edges of the tag-stock web to provide a web of tags and a web of labels in side-by-side relationship, the tag-stock web having severable tags and labels with each tag having a tab, wherein the tab is foldable upon and is adhesively adherable to a first portion of the remainder of the tag, the portion of the tag beyond the first position constituting a second portion, wherein the tag-stock web is releaseably adhered to the release liner web by the adhesive on the tabs and/or on the first portions, wherein the web of labels is releasably adhered to the release liner web by adhesive, and adhesive deadener masking-off the adhesive on the second portions of the tag web.

7. A composite web as defined in claim 6, wherein the adhesive is uniform across and along the entire face of the tag stock.

8. A composite web as defined in claim 6, wherein the adhesive is uniform across and along the entire face of the tag stock, and wherein the tag web and the label web are only partially severed.

9. A composite web as defined in claim 6, wherein the tag web and the label web are connected by frangible lands of the tag stock.

10. A composite web as defined in claim 6, the tags and labels being severable into pairs by cutting the composite web transversely along a cut line, and wherein the adhesive deadener extends transversely across the tag stock web on both sides of the cut line.

11. A composite web as defined in claim 10, wherein the adhesive deadener makes a generally L-shaped pattern.

* * * * *

UNITED STATES PATENT AND TRADEMARK OFFICE

CERTIFICATE OF CORRECTION

PATENT NO. : 7,579,059 B2
APPLICATION NO. : 11/328016
DATED : August 25, 2009

INVENTOR(S) : Paul A. Chamandy

It is certified that error appears in the above-identified patent and that said Letters Patent is hereby corrected as shown below:

In claim 6, column 6, line 34, after -beyond the first- delete “position” and insert --portion--.

Signed and Sealed this

Twentieth Day of October, 2009

David J. Kappos
*Director of the United States Patent and Trademark Office*